United States Patent [19]
Flohrs et al.

[11] 3,755,882
[45] Sept. 4, 1973

[54] METHOD OF MAKING SEMICONDUCTOR COMPONENTS

[75] Inventors: Peter Flohrs, Nurnberg; Horst Schafer, Wendelstein; Theo Tovar, Nurnberg, all of Germany

[73] Assignee: SEMIKRON Gesellschaft fur Gleichrichterbau u Elektronik mbH, Nurnberg, Germany

[22] Filed: July 13, 1970

[21] Appl. No.: 54,344

[30] Foreign Application Priority Data

July 11, 1969 Germany .................. P 19 35 143.0

[52] U.S. Cl. .............. 28/471.7, 29/471.1, 29/473.1, 29/504, 29/589, 75/168, 75/173

[51] Int. Cl. .......................................... B23k 31/02

[58] Field of Search .................. 29/473.1, 501, 502, 29/504, 471.7, 589, 471.1; 317/234; 75/168, 173

[56] References Cited

UNITED STATES PATENTS

| | | | |
|---|---|---|---|
| 3,180,022 | 4/1965 | Briggs et al. | 29/502 X |
| 3,233,309 | 2/1966 | Emeis | 29/501 X |
| 3,337,947 | 8/1967 | Terrill et al. | 29/502 X |
| 3,375,143 | 3/1968 | Garner et al. | 29/501 X |
| 3,447,236 | 6/1969 | Hatcher, Jr. | 29/504 X |
| 3,478,416 | 11/1969 | Hamilton | 29/504 X |
| 3,331,996 | 7/1967 | Green | 317/234 M |
| 3,409,974 | 11/1968 | Lueck et al. | 317/235 |
| 3,416,048 | 12/1968 | Spickenreuther | 317/234 |

FOREIGN PATENTS OR APPLICATIONS

| | | | |
|---|---|---|---|
| 683,210 | 3/1964 | Canada | 29/501 |

OTHER PUBLICATIONS

Terms and Definitions, prepared by AWS Committee on Definitions and Symbols, 1969, pp. 1,2,14,29,46,47.

*Primary Examiner*—J. Spencer Overholser
*Assistant Examiner*—Ronald J. Shore
*Attorney*—Spencer and Kaye

[57] ABSTRACT

A molybdenum contact platform of a semiconductor wafer is brazed to a metallic carrier body using as solder an alloy of aluminum at 15 to 60 weight percent, remainder silver, or magnesium at 44 to 60 weight percent, remainder silver.

10 Claims, 4 Drawing Figures

Patented Sept. 4, 1973 3,755,882

*INVENTORS.*
Peter Flohrs
Horst Schäfer
Theo Tovar

*BY* Spencar & Kaye
*ATTORNEYS.*

METHOD OF MAKING SEMICONDUCTOR COMPONENTS

BACKGROUND OF THE INVENTION

The present invention relates to the brazing of a contact platform for a semiconductor wafer to a metallic carrier body.

In the case of semiconductor components, especially semiconductor rectifying elements of medium and high power, it is known to contact the semiconductor wafer to a metallic carrier body using a brazing process. A problem in such contacting has been that thermal expansions of the materials bonded to the wafers can lead to the destruction of the semiconductor wafers. In order to protect against this, it is known to interpose between the semiconductor wafer and the metallic carrier body a contact platform preferably of tungsten or molybdenum. Since the coefficients of thermal expansion of tungsten and molybdenum are close to those of semiconductor material, such procedure has operated to protect the semiconductor wafer.

Both brazing filler metals and solders have been used for brazing and soldering respectively the contact platform to the metallic carrier body, which is preferably of copper. Solders have proven unsuitable — especially in situations where the electrical current load frequently changes, because material fatigue phenomena lead to an early failure of the arrangements. Silver-based brazing filler metals do give the desired resistance to fluctuating current loads; but they must moreover exhibit other very essential properties, especially when being used for semiconductor rectifiers able to carry high power loads. Namely, brazing filler metals in such situations must have thermal and electrical conductivities appropriate for the materials to be joined and they must also exhibit a good wetting of the surfaces to be joined, in order to produce faultless interfacial bonding.

A brazing filler metal for connecting a contact platform of molybdenum or tungsten to a metallic carrier body of iron, or an iron alloy, has been disclosed in German Auslegeschrift (published Pat. application) DAS No. 1,176,451. This brazing filler metal is made of silver and copper along with small additions of other materials. Unfortunately, this brazing filler metal exhibits a high (about 750°C) solidus point, which property leads to high stresses in the interface between carrier body and platform during cooling. In order to prevent these stresses from damaging the semiconductor material, it is necessary to use thicker contact platforms and the making of these thicker platforms is inordinately expensive.

A brazing connection between a contact platform of tungsten and a copper carrier body is described in German Offenlegungsschrift (laid-open Pat. application) No. 1,439,905. This brazing filler metal is made almost completely of aluminum. It exhibits, however, an unsatisfactory wetting of contact surfaces. As a result, it is necessary to first go through an expensive pretreatment of the carrier body before proceeding with brazing.

Finally, the eutectic gold-tin solder described in German Pat. DAS No. 1,167,162 is still frequently used to produce a desired interfacial brazing connection. Although the melting point of this brazing filler metal lies at 280°C, it exhibits very good strength and is consequently very expensive. Moreover, its thermal and electrical conductivities are not completely corresponding to the materials to be connected. Also in this case, the copper carrier body must be appropriately pretreated.

SUMMARY OF THE INVENTION

An object of the present invention, therefore, is to provide a brazing connection that eliminates the above-described disadvantages.

Another object of the present invention is to provide a brazing filler metal which, because of a favorable melting point, gives no or only slight diffusion of brazing components into a carrier body.

Yet another object of the present invention is to provide a brazing filler metal which, especially when using special body materials, causes no change of the original strength properties for the further working of a component.

These as well as other objects which will become apparent in the discussion that follows are achieved, according to the present invention by a brazing connection for semiconductor components wherein a metallic carrier body is connected securely by brazing to a contact platform for a semiconductor wafer. The braze is resistant to frequent temperature changes and is made of 15 to 60 weight percent aluminum, remainder silver, or 44 to 60 weight percent magnesium, remainder silver. If need be, the contact platform can be provided with a suitable metallized coating.

DESCRIPTION OF THE PREFERRED EMBODIMENTS

Figure 1:
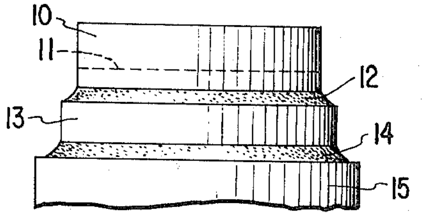
FIG. 1 is an elevational view of a semiconductor component according to the invention.

FIG. 1 is an example of the brazed connection according to the invention used in a semiconductor component. Rectifying silicon wafer 10 contains a PN-junction 11 and is brazed to contact platform 13 via film 12 of brazing material. The aluminum-silver or aluminum-magnesium brazing alloy used in the method of the present invention is shown as film 14 lying between contact platform 13 and metallic carrier body 15.

The first preferred embodiment of the present invention uses the alloy of aluminum and silver. The phase diagram for the silver-aluminum system is to be found on page 2 of the Handbook, Constitution of Binary Alloys, McGraw Hill New York 1958. The relative amounts of the two brazing components are limited on the high-silver side by the undesired structure changes arising in alloys of over 727° C melting temperature during their cooling. On the high-aluminum side, the critical factor is the obtaining of flawless wetting of the surfaces to be joined. The range 15 to 60 weight percent aluminum has been determined experimentally to give good results.

The most favorable results yet obtained have been in the joining of a copper carrier body with a molybdenum contact platform disc using brazing compositions whose solidus points are at the eutectic temperature of 566° C and which lie in the range of the horizontal portion of the solidus line of the phase diagram between about 15 weight percent aluminum, remainder silver, to about 44.5 weight percent aluminum, remainder silver.

Figure 2:
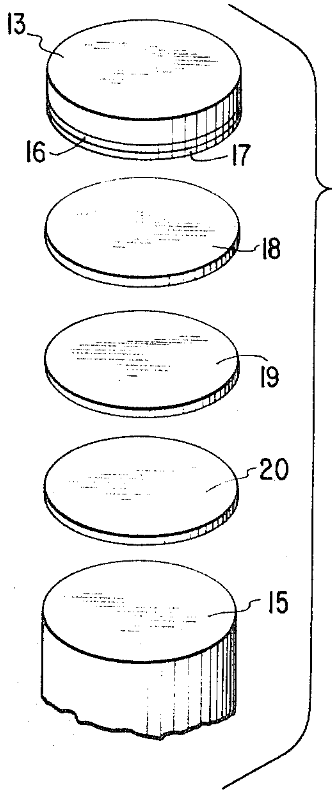
FIGS. 2–4 are exploded views of stacks used in the process of the invention.

The brazing filler metal itself can be provided in the form of discs formed from an alloy of the appropriate composition. Significantly more advantageous, however, are discs of silver and aluminum. Such discs can be stacked one on top of the other between the surfaces to be joined. The discs are dimensioned in their planes to coincide with the geometrical shapes of the surfaces to be joined and their thicknesses correspond to the desired weight proportions of the corresponding components in the molten brazing metal. It is also possible to provide more than one disc of a given material and to provide special sequencing of the discs in a stack as a function of the material and surface characteristics of the parts to be joined as well as of the thickness of the desired hard solder layer. For example, referring to FIG. 2, in joining a copper carrier body 15 with a contact platform disc 13 of molybdenum there is arranged on the copper carrier body 15, which perhaps serves as the lower part of the housing of a semiconductor component, a silver disc 20, on this an aluminum disc 19, then again a silver disc 18, and finally a metallized, preferably with a nickel film 16 and a silver film 17, molybdenum disc 13. Tungsten can be used in place of the molybdenum. If need be, several discs of each component can be inserted in the stack in order to achieve the particular weight percent ratio in the molten brazing compound. A metallizing of the carrier body is not necessary, which fact provides a distinct processing advantage in the present invention.

Figure 3:
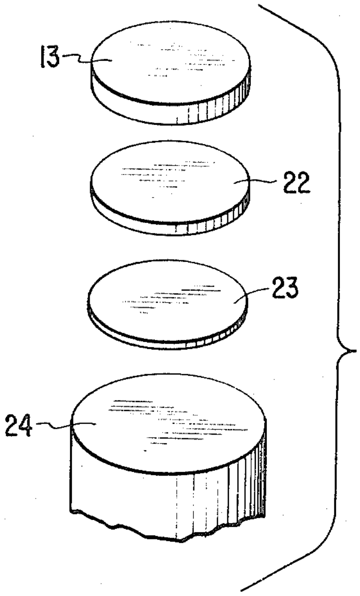

Because of the high reducing ability of aluminum, it is also possible in the present invention to place an aluminum disc directly in contact with the bare surface of either of the parts to be joined. This special property of aluminum makes it possible to use the brazing compound of the present invention for the brazing of other metals suitable for contacting of for service as housing components in semiconductor technology, even though such metals exhibit a high propensity for oxidation. Examples of such other metals are brass and steel. Moreover, the brazing compound of the present invention is suited in general for making brazing connections between base metals of high propensity for oxidation. FIG. 3 shows an example where a stack to be furnace-brazed consists of a contact platform 13, a silver disc 22, an aluminum disc 23, and a steel carrier body 24.

Figure 4:
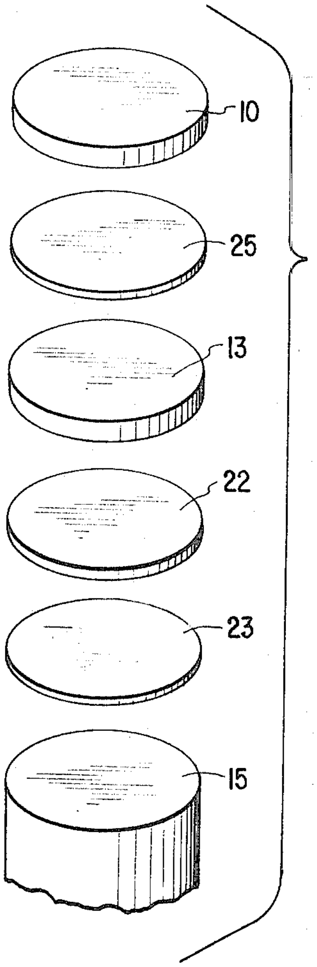

The brazing connection of the present invention is especially important for producing rectifying components having one or more PN-junctions and having an alloy contact between the semiconductor wafer and the contact platform. Thus, the brazing connection of the present invention makes possible a joining, for example, of the layered assembly of FIG. 4 beginning with a copper carrier body 15, on that an aluminum disc 23, on the aluminum disc a silver disc 22, on the silver disc a contact platform 13, on the contact platform an aluminum disc 25, and on the aluminum disc an N-conductive silicon wafer 10, in a single heating step, whereby an especially economical method of manufacture is achieved.

Because of the many similar properties of aluminum and magnesium, the desired brazing connection of the present invention can also be made with a silver-magnesium alloy. A phase diagram for the silver-magnesium system appears at page 31 of the Handbook, Constitution of Binary Alloys McGraw Hill 1958. A preferred composition range for this alloy is also arranged about the eutectic composition (melting point equals 471°C) and lies between about 44 weight percent magnesium, remainder silver, to about 60 weight percent magnesium, remainder silver.

The making of the brazing connection according to the present invention proceeds in the manner common for an alloying process in semiconductor technology. Preferably, first a carrier body, then on top of that a silver disc, then an aluminum disc, then another silver disc, and finally a contact platform are arranged in a vertical stack. This stack is placed in a holder which places the entire stack in compression. The stack and holder are then placed in a furnace having an inert atmosphere and heated to a temperature determined by the particular brazing composition being used until the brazing compound becomes molten and wets the surfaces of the carrier body and contact platform. Upon cooling, the contact platform is securely bonded to the carrier body.

Further illustrative of the principle of the invention are the following examples:

EXAMPLE I:

A disc of molybdenum as a contact platform with a thickness of 0.5 mm covered with a first film of nickel with a thickness of 3 $\mu$um and a second film of silver with a thickness of 5 $\mu$um and in order to get a brazement as per the invention a disc of aluminum with a thickness of 60 $\mu$um and a silver disc of 50 $\mu$um thickness is provided. The stack built by an aluminum disc and a silver disc and the contact platform is put on an etched carrier body of copper. This arrangement is firmly joined by means of a heat treatment lasting 15 minutes at 630°C in inert atmosphere, for example in hydrogen or forming gas. Then follows a constant cooling to room temperature. The procedure conditions are uncritical.

EXAMPLE II:

When using a carrier body of steel the same is covered with a film of nickel with a thickness of 5 $\mu$um. The molybdenum disc shows same dimensions and same contact films. For producing the brazement one uses a disc of aluminum of 80 $\mu$um thickness and a disc of silver of 40 $\mu$um thickness. The temperature for producing the brazing connection is 680°C. All other conditions of procedure are the same as in example I.

EXAMPLE III:

For a brazement of magnesium and silver as per the invention the disc of molybdenum may again be formed corresponding to example I. There is then formed a layer structure of a carrier body of copper, a first disc of magnesium of 130 $\mu$um thickness a second disc of silver of 20 $\mu$um thickness and the prepared molybdenum disc. By a temperature treatment of 600°C the carrier body is brazed under same procedure conditions as shown in example I.

EXAMPLE IV:

Instead of the one silver disc as per example I one may use two silver discs of 25 $\mu$um thickness each, which are arranged in layers by turns with the aluminum disc on the carrier. Dimensions and metallic covers as well as procedure conditions correspond to the statements of example I.

EXAMPLE V:

For producing a rectifier element with silicon as semiconductor material the stack structure of example I is brought on a carrier body of copper. On the free surface of the contact platform an aluminum disc of 40 μum thickness is placed which had been cleaned before this by etching in a potash lye of 10 percent or in a hydrocloric acid of 5 percent. On said disc the for example N-conducting silicon wafer is brought. The materials arranged in this way are firmly connected in a single process step by means of heat treatment as per the conditions of example I.

When using P-conducting semiconductor raw material the semiconductor tablet is in connection with the production of the semiconductor element provided with a $P^+$ contact layer by alloying an aluminum disc.

It will be understood that the above description of the present invention is susceptible to various modifications, changes and adaptations, and the same are intended to be comprehended within the meaning and range of equivalents of the appended claims.

We claim:

1. The method of connecting a contact platform to a semiconductor wafer and to a metallic carrier body, comprising the steps of brazing the contact platform to the carrier body with an alloy consisting essentially of
   a. a metal consisting of magnesium at 44 to 60 weight percent;
   b. remainder silver; and brazing the contact platform to the semiconductor wafer.
2. The method as claimed in claim 1, wherein the carrier body is a metal having a high propensity for oxidation, the contact platform is a metal selected from the group consisting of molybdenum and tungsten.
3. The method as claimed in claim 2, wherein the carrier body is selected from the group consisting of copper, brass and steel.
4. The method as claimed in claim 1, wherein the step of brazing the contact platform to the carrier body includes the stacking of at least one disc of the metal of paragraph (a) with at least one disc of silver.
5. The method as claimed in claim 1, wherein the step of brazing the contact platform to the carrier body includes the stacking of discs forming the composition of said alloy, where the contact platform is a metal selected from the group consisting of molybdenum and tungsten, and where the carrier body is selected from the group consisting of copper and steel.
6. The method as claimed in claim 4, wherein the discs are dimensioned to coincide with the surface of the contact platform.
7. The method as claimed in claim 4, wherein the total thicknesses of the two types of discs correspond to the desired relative amounts of the metals of paragraphs (a) and (b) in the alloy.
8. The method as claimed in claim 7, wherein the carrier body is copper and the contact platform is molybdenum metallized with first a film of nickel and then, on the nickel film, a film of silver, the step of brazing the contact platform to the carrier body including forming a stack having the following sequence of parts: carrier body, a silver disc, a magnesium disc, a silver disc, the silver film, the nickel film and the contact platform.
9. The method as claimed in claim 7, wherein the carrier body is copper and the contact platform is molybdenum, the steps of brazing including forming a stack having the following sequence of parts: carrier body, a magnesium disc, a silver disc, contact platform, a magnesium disc, and an N-conductive silicon wafer; the steps of brazing also including a single heating step for bonding the entire stack into an integral assembly and for transforming the silicon wafer into a rectifier.
10. The method as claimed in claim 5, the step of brazing including the placing of a magnesium disc directly in contact with the bare surface of either the contact platform or the carrier body.

* * * * *